(12) United States Patent
Allard et al.

(10) Patent No.: US 11,609,037 B2
(45) Date of Patent: Mar. 21, 2023

(54) VACUUM INSULATED REFRIGERATOR STRUCTURE WITH THREE DIMENSIONAL CHARACTERISTICS

(71) Applicant: WHIRLPOOL CORPORATION, Benton Harbor, MI (US)

(72) Inventors: Paul B. Allard, Benton Harbor, MI (US); Abhay Naik, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 120 days.

(21) Appl. No.: 17/232,630

(22) Filed: Apr. 16, 2021

(65) Prior Publication Data

US 2021/0231359 A1 Jul. 29, 2021

Related U.S. Application Data

(62) Division of application No. 16/093,238, filed as application No. PCT/US2016/027722 on Apr. 15, 2016, now Pat. No. 11,009,284.

(51) Int. Cl.
*F25D 23/00* (2006.01)
*F25D 23/02* (2006.01)
(Continued)

(52) U.S. Cl.
CPC .............. *F25D 23/02* (2013.01); *B29C 51/12* (2013.01); *B29C 51/16* (2013.01); *B29C 70/70* (2013.01);
(Continued)

(58) Field of Classification Search
CPC ...... F25D 23/064; F25D 23/066; F25D 23/06; F25D 23/02; F25D 23/068;
(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

Cai et al., "Generation of Metal Nanoparticles By Laser Ablation of Microspheres," J. Aerosol Sci., vol. 29, No. 5/6 (1998), pp. 627-636.
(Continued)

*Primary Examiner* — Chi Q Nguyen
(74) *Attorney, Agent, or Firm* — Price Heneveld LLP

(57) ABSTRACT

A method of making a vacuum insulated refrigerator structure includes positioning a core of overlapping stacked sheets of fiberglass mat in an envelope of impermeable barrier material. The core is pressed into a predefined three dimensional shape by pressing first and second mold parts together. The core is evacuated, and the envelope is sealed to form a three dimensional core having an airtight envelope around the core. The three dimensional vacuum core is positioned between a wrapper and a liner, and the wrapper and the liner are interconnected to form a vacuum insulated refrigerator structure.

17 Claims, 10 Drawing Sheets

(51) Int. Cl.
  *F25D 23/06* (2006.01)
  *B29C 51/12* (2006.01)
  *B29C 51/16* (2006.01)
  *B29C 70/70* (2006.01)
  *B29L 31/00* (2006.01)

(52) U.S. Cl.
  CPC ........... *F25D 23/06* (2013.01); *F25D 23/066* (2013.01); *B29L 2031/7622* (2013.01); *F25D 2201/14* (2013.01)

(58) Field of Classification Search
  CPC .. F25D 2201/00; F25D 2201/122; F25D 1/12; F25D 23/028; F25D 2201/12; F25D 2201/1262; F25D 2201/124; F25D 2201/14; B29C 51/16; B29C 70/70; B29C 51/12; B29C 51/10; B29L 2031/7622
  USPC .............. 49/507; 220/592.26, 592.25, 592.1, 220/592.27, 62.15, 62.22
  See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Louis et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,118,266 A | 10/1978 | Kerr |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A | 8/1990 | Ferrario et al. |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barto et al. |
| 5,076,984 A | 12/1991 | Bisplinghoff et al. |
| 5,082,335 A | 1/1992 | Cur et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Cospey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |

(56) References Cited

U.S. PATENT DOCUMENTS

| | | |
|---|---|---|
| 5,704,107 A | 1/1998 | Schmidt et al. |
| 5,716,581 A | 2/1998 | Tirrell |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | De Vos et al. |
| 5,866,228 A | 2/1999 | Awata |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,037,033 A | 3/2000 | Hunter |
| 6,063,471 A | 5/2000 | Dietrich et al. |
| 6,094,922 A | 8/2000 | Ziegler |
| 6,109,712 A * | 8/2000 | Haworth ............ A47L 15/4209 312/406 |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schultz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,623,413 B1 | 9/2003 | Wynne |
| 6,629,429 B1 | 10/2003 | Kawamura et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Mien et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,423 B2 | 11/2007 | Mü et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,456,040 B2 | 6/2013 | Allard et al. |
| 8,486,215 B2 | 7/2013 | Amann |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |

(56) References Cited

U.S. PATENT DOCUMENTS

| | | |
|---|---|---|
| 9,140,481 B2 | 9/2015 | Curr et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,840,042 B2 | 12/2017 | Allard et al. |
| 9,927,169 B2 | 3/2018 | Baker et al. |
| 9,976,753 B2 | 5/2018 | Hynes |
| 10,024,544 B2 | 7/2018 | Bhogal et al. |
| 10,077,342 B2 | 9/2018 | An et al. |
| 10,473,217 B2 | 11/2019 | Deka et al. |
| 10,610,985 B2 | 4/2020 | Liu et al. |
| 11,009,284 B2 * | 5/2021 | Allard ................... B29C 70/70 |
| 11,162,630 B2 * | 11/2021 | Deka ................. C04B 38/0038 |
| 11,365,843 B2 * | 6/2022 | Deka ................. C04B 24/34 |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano et al. |
| 2004/0180176 A1 | 9/2004 | Rusek, Jr. |
| 2004/0226141 A1 | 11/2004 | Fates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espendola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer et al. |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Nuemann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Zoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horii et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCraken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 * | 10/2013 | Cur ........................ B29C 53/00 |
| | | 29/890.035 |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2014/0009055 A1 | 1/2014 | Cho et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1 | 11/2014 | Kim et al. |

(56) References Cited

U.S. PATENT DOCUMENTS

| | | |
|---|---|---|
| 2014/0364527 A1 | 12/2014 | Wintermantel et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0159995 A1 | 6/2017 | Allo et al. |
| 2017/0159998 A1* | 6/2017 | Dherde ............... B29C 44/5627 |
| 2017/0176085 A1 | 6/2017 | Allard |
| 2017/0176086 A1 | 6/2017 | Kang |
| 2017/0176090 A1 | 6/2017 | Allard et al. |
| 2017/0184339 A1 | 6/2017 | Liu et al. |
| 2017/0190081 A1 | 7/2017 | Naik et al. |
| 2017/0191746 A1 | 7/2017 | Seo |
| 2019/0063819 A1 | 2/2019 | Allard et al. |
| 2019/0128594 A1 | 5/2019 | Allard et al. |
| 2020/0130240 A1* | 4/2020 | Costanza ............. B29C 44/1276 |
| 2020/0278148 A1* | 9/2020 | Allo ....................... F16L 59/065 |
| 2021/0356197 A1* | 11/2021 | Shannigrahi .......... F25D 23/028 |
| 2022/0119304 A1* | 4/2022 | Raskar .................... C03C 3/093 |
| 2022/0136762 A1* | 5/2022 | Raskar ................... F25D 23/063 428/69 |
| 2022/0205709 A1* | 6/2022 | Raskar ................... F25D 23/064 |
| 2022/0316791 A1* | 10/2022 | Jung ..................... F25D 19/006 |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 12/2011 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 410292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 19948361 | 4/2001 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1484563 | 12/2004 |
| EP | 1496322 | 1/2005 |
| EP | 1505359 | 2/2005 |
| EP | 1602425 A1 | 12/2005 |
| EP | 1624263 A2 | 8/2006 |
| EP | 1344008 | 9/2006 |
| EP | 1338854 | 12/2009 |
| EP | 2342511 | 7/2011 |
| EP | 2543942 A2 | 1/2013 |
| EP | 2607073 | 6/2013 |
| EP | 2789951 | 10/2014 |
| EP | 2801774 | 11/2014 |
| EP | 2878427 A1 | 6/2015 |
| EP | 2836349 B1 | 8/2017 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S59191588 | 12/1984 |
| JP | 1318880 | 12/1989 |
| JP | 403013779 | 1/1991 |
| JP | 404165197 | 6/1992 |
| JP | 04165197 | 10/1992 |
| JP | 04309778 A | 11/1992 |
| JP | H06159922 | 6/1994 |
| JP | H071479 | 1/1995 |
| JP | H07167377 | 7/1995 |
| JP | 3145547 | 6/1996 |
| JP | H08300052 | 11/1996 |
| JP | H08303686 | 11/1996 |
| JP | H09166271 | 6/1997 |
| JP | H10113983 | 5/1998 |
| JP | 11159693 A | 6/1999 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 200677792 | 3/2006 |
| JP | 2006161834 A | 6/2006 |
| JP | 2006161945 | 6/2006 |
| JP | 3792801 | 7/2006 |
| JP | 2006200685 A | 8/2006 |
| JP | 2007263186 | 10/2007 |
| JP | 2008064323 A | 3/2008 |
| JP | 4111096 | 7/2008 |
| JP | 2008157431 | 7/2008 |

(56) References Cited

FOREIGN PATENT DOCUMENTS

| | | |
|---|---|---|
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012042011 A | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 1017776 | 2/2011 |
| KR | 101017776 | 2/2011 |
| KR | 20120007241 | 1/2012 |
| KR | 20120046621 | 5/2012 |
| KR | 20120051305 | 5/2012 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 02 | 6/1999 |
| RU | 2162576 02 | 1/2001 |
| RU | 2166158 C1 | 4/2001 |
| RU | 2187433 02 | 8/2002 |
| RU | 2234645 C1 | 8/2004 |
| RU | 2252377 | 5/2005 |
| RU | 2253792 02 | 6/2005 |
| RU | 2349618 02 | 3/2009 |
| RU | 2414288 02 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 098049506 | 11/1998 |
| WO | 9920961 A1 | 4/1999 |
| WO | 9920964 | 4/1999 |
| WO | 1999030964 | 4/1999 |
| WO | 200160598 | 8/2001 |
| WO | 200202987 | 1/2002 |
| WO | 2002052208 | 4/2002 |
| WO | 2002052208 A1 | 7/2002 |
| WO | 02060576 A1 | 8/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2006120183 | 11/2006 |
| WO | 2006120198 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods For Producing Hollow Glass Microspheres," Powerpoint, cached from Google, Jul. 2009, 6 pages.

* cited by examiner

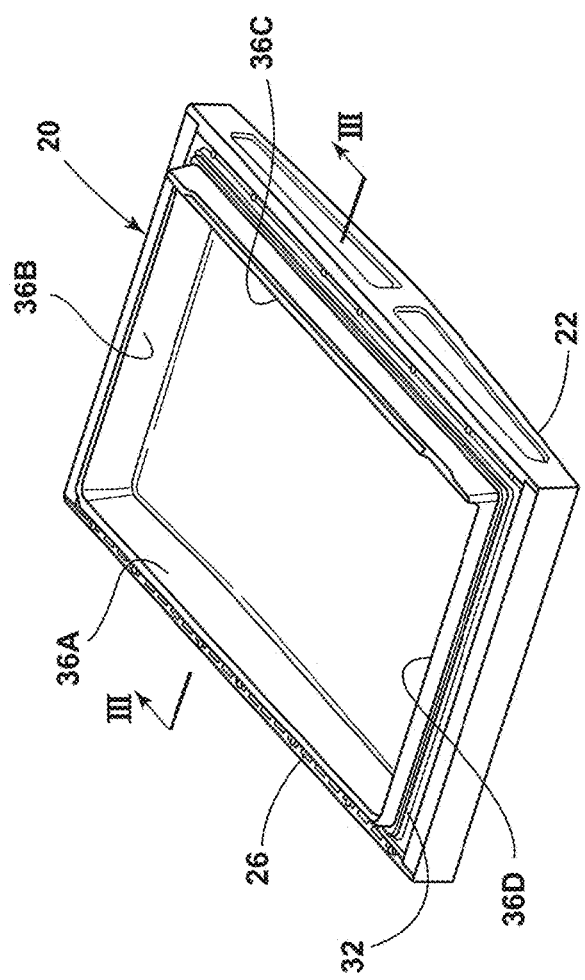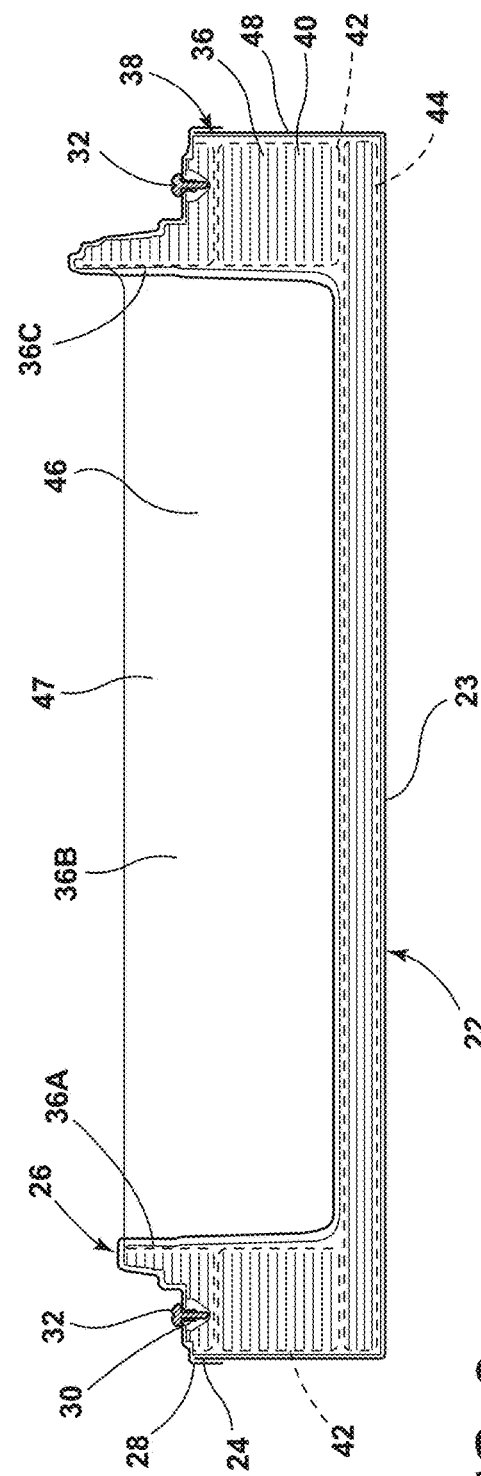
FIG. 2
FIG. 3

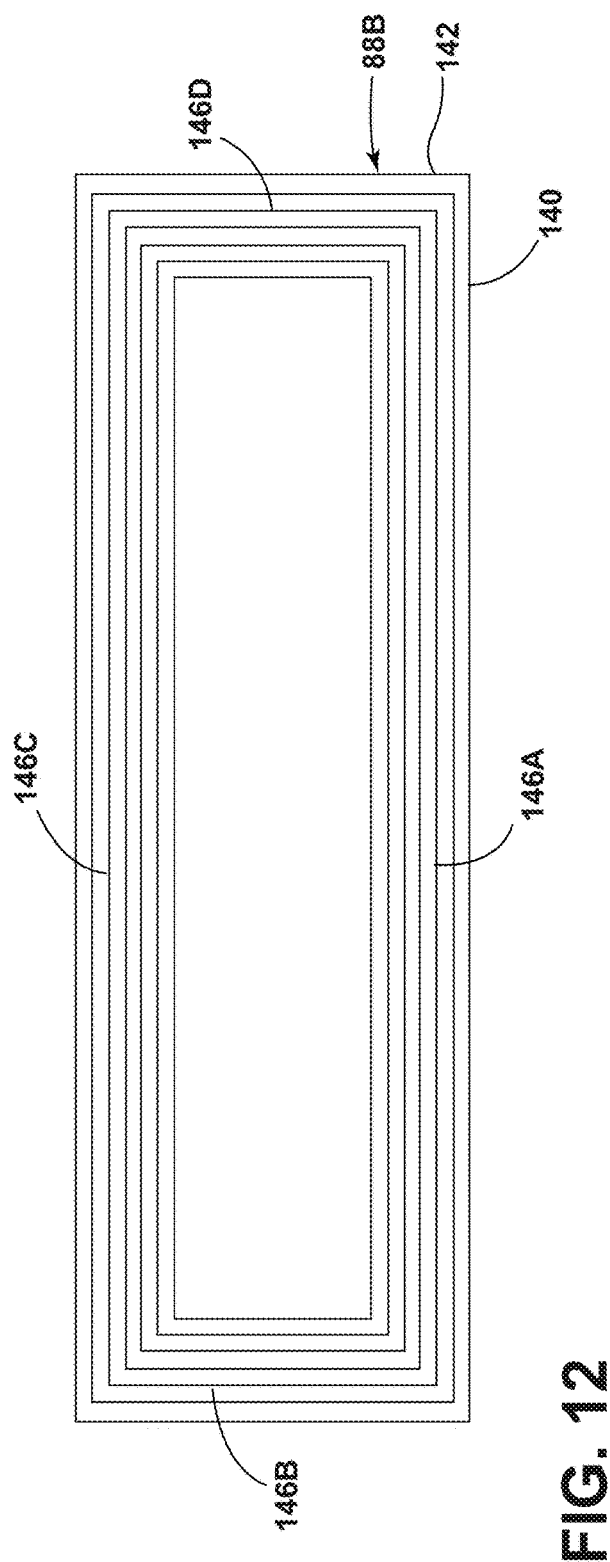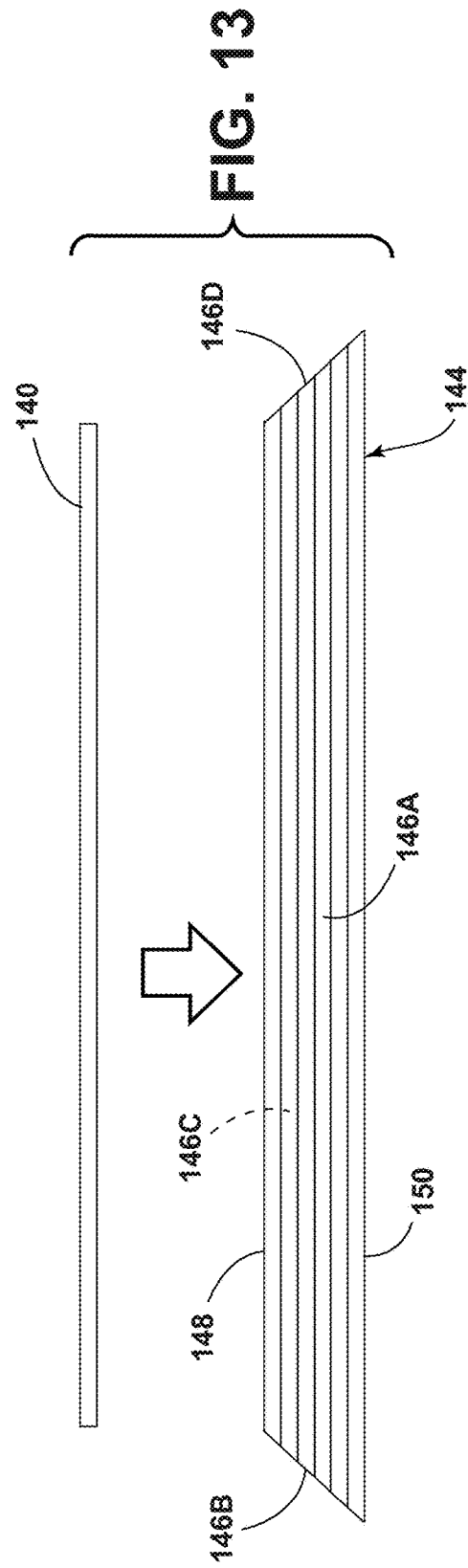

VACUUM INSULATED REFRIGERATOR STRUCTURE WITH THREE DIMENSIONAL CHARACTERISTICS

CROSS REFERENCE TO RELATED APPLICATIONS

The present application is a division of U.S. patent application Ser. No. 16/093,238, filed on Oct. 12, 2018, now U.S. Pat. No. 11,009,284, issued on May 18, 2021, which claims the priority benefits of International Patent Application No. PCT/US2016/027722, filed on Apr. 15, 2016, the entire disclosures of which are incorporated herein by reference.

BACKGROUND

Various types of vacuum insulated refrigerator structures have been developed. Known vacuum insulated structures may include a core panel that is positioned between a wrapper and a liner. The core panel may comprise a simple rectangle of uniform thickness with flat inner and outer surfaces, and flat edge surfaces that extend transversely between the inner and outer surfaces. However, the flat two dimensional ("2D") shapes of these core panels may limit the applications of these types of panels.

SUMMARY

One aspect of the present disclosure is a method of making a vacuum insulated refrigerator structure. The method includes positioning a core comprising a plurality of overlapping stacked sheets of a flexible core material over a first mold part of a mold tool with a first sheet of impermeable barrier material positioned between a first side of the sheets of the core material and the first mold part. The sheets of flexible core material may comprise woven or non-woven fiberglass mat or other suitable material. The method includes positioning a second sheet of impermeable barrier material over a second side of the core material that is opposite the first side. The core is formed into a predefined three dimensional shape by pressing a second mold part of the mold tool into contact with the second sheet of impermeable barrier material. The core is evacuated, and edge portions of the first and second sheets are sealed together while the core is evacuated to form a three dimensional core having an airtight envelope around the core. The three dimensional vacuum core is removed from the mold tool, and the three dimensional vacuum core is positioned between a wrapper and a liner. The wrapper and the liner are interconnected to form a vacuum insulated refrigerator structure. The vacuum insulated structure may comprise an outer panel of a refrigerator door, a refrigerator cabinet or portion thereof, or other refrigerator structure.

Another aspect of the present disclosure is a method of making a vacuum insulated refrigerator door having an inner side and an outer side. The method includes cutting a first plurality of sheets of fiberglass mat to form rings having generally rectangular outer peripheral edges forming enlarged central openings through the first plurality of sheets. The method includes providing a second plurality of sheets of fiberglass mat having generally rectangular peripheral edges and continuous central portions that do not have openings therethrough. The first and second plurality of sheets are stacked to form a stacked assembly having a generally rectangular frame portion and an outer panel portion that together form a generally rectangular cavity. The method includes forming an envelope of impermeable material around the stacked assembly, and a vacuum is formed inside the envelope. The envelope is sealed to form a three dimensional ("3D") vacuum core. The three dimensional vacuum core is positioned between a wrapper and a liner, and the wrapper and the liner are interconnected to form a vacuum insulated refrigerator structure.

Another aspect of the present disclosure is a vacuum insulated refrigerator structure. The vacuum insulated refrigerator structure may comprise a door front panel or other refrigerator cabinet structure. The refrigerator structure includes a polymer lining having a first peripheral portion and a wrapper having a second peripheral portion that is connected to the first peripheral portion to define a cavity. A 3D vacuum core is disposed in the cavity. The 3D vacuum core includes a plurality of stacked mats disposed inside an impermeable envelope that is sealed to prevent entry of gas. A first plurality of the stacked mats have enlarged central openings therethrough to form a frame portion. A second plurality of the stacked mats do not have enlarged central openings therethrough and form an outer panel portion. The frame portion and the outer panel portion together define a U-shape in cross section.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 2 is an isometric view of a vacuum insulated refrigerator structure;

FIG. 3 is a cross sectional view of the vacuum insulated refrigerator structure of FIG. 2;

FIG. 12 is a top plan view of a plurality of sheets of fiberglass mat;

FIG. 13 is an exploded side elevational view of a plurality of fiberglass mats.

DETAILED DESCRIPTION OF EMBODIMENTS

Figure 1:
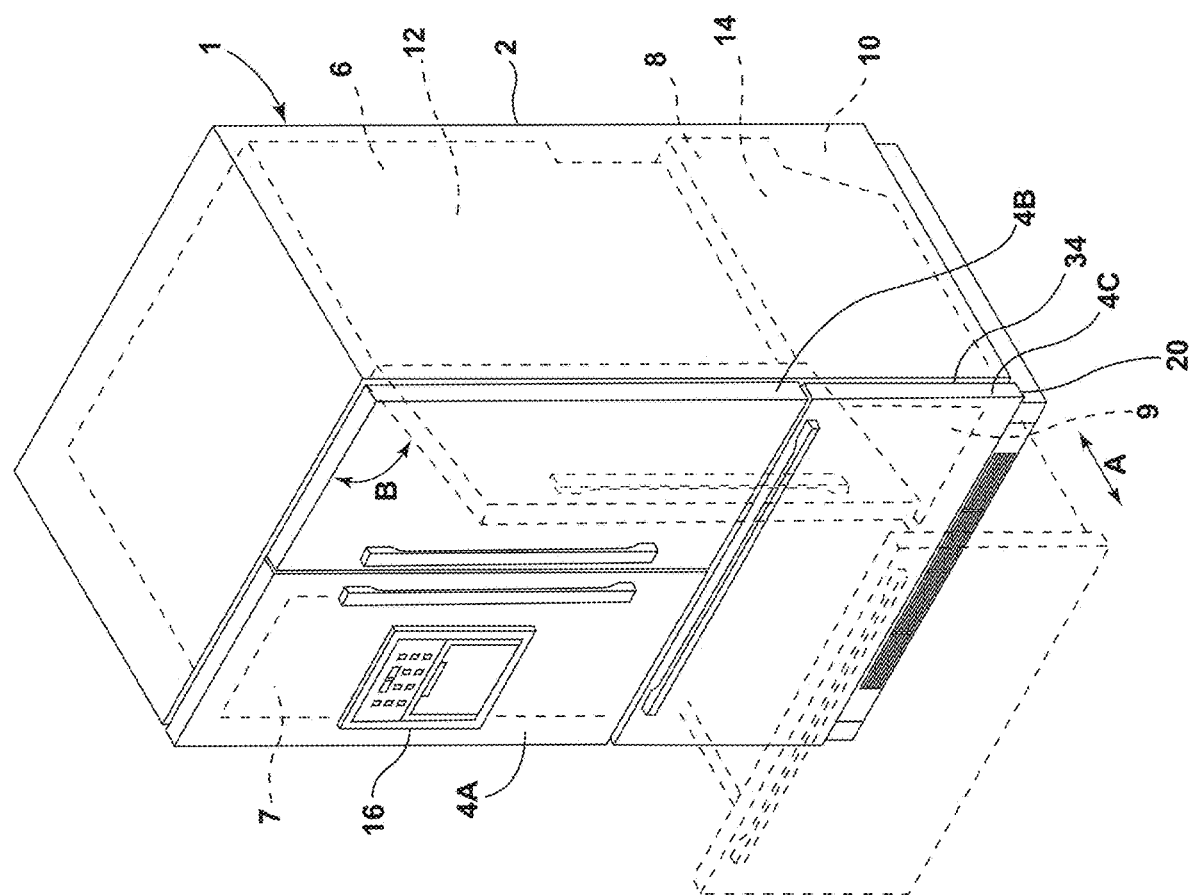
FIG. 1 is an isometric view of a refrigerator.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a cabinet 2 and upper doors 4A and 4B that are rotatably mounted to the cabinet 2 for movement between open and closed positions. Doors 4A and 4B provide access to a refrigerator compartment 12 that is formed in part by an inner liner 6. A lower freezer door 4C provides access to a freezer compartment 9 that is defined in part by a lower liner 8. The lower freezer door 4C may comprise a drawer that slides linearly as designated by the arrow "A." Alternatively, freezer door 4C may be rotatably mounted to the cabinet 2 for rotational movement "B" that is similar to that of doors 4A and 4B. Refrigerator 1 includes a space 10 for housing a refrigeration system (not shown) outside of refrigerator compartment 12 and freezer compartment 9. The refrigeration system may comprise a conventional refrigeration system of a known type including a compressor, evaporator, condenser, and other components. Alternatively, the refrigeration system may comprise a thermoelectric system or other known cooling system.

With reference to FIGS. 2 and 3, a vacuum insulated structure such as front panel 20 of lower door 4C may include a wrapper 22 and a liner 26. Upper doors 4A and 4B and/or cabinet 2 may also be constructed in the same manner as front panel 20. Wrapper 22 may comprise sheet metal that is formed utilizing known metal-forming processes, and liner 26 may comprise a polymer material that is vacuum formed utilizing known processes. However, wrapper 22 and/or liner 26 may comprise other materials formed by other processes. Wrapper 22 includes a flange or edge portion 24 that is interconnected with a flange or edge portion 28 of liner 26 in a known manner utilizing adhesives, fasteners, etc. In the illustrated example, the edge portions 24 and 28 overlap, and liner 26 forms a groove or channel 30 that receives a resilient gasket 32 to seal the panel 20 to a front surface 34 (FIG. 1) of cabinet 2 in a known manner. Resilient gasket 32 may be in the form of a ring, and may include an elongated magnet that forms a seal with cabinet 2.

With reference to FIG. 3, the wrapper 22 and liner 26 together define an internal cavity 36. A three dimensional ("3D") vacuum core 38 is disposed in the cavity 36. As discussed in more detail below, the 3D vacuum core 38 comprises a plurality of sheets 40 of fiberglass mat (woven or non-woven) or other suitable material that are stacked together to form a frame portion 42, and a front panel portion 44. Sheets 40 may comprise virtually any suitable material. In general, sheets of flexible porous material are preferred. When fully assembled, frame portion 42 and panel portion 44 form a unitary structure. However, the mats 40B (FIG. 6) utilized to form frame portion 42 are cut to have different shapes than the mats 40A (FIG. 4) utilized to form panel portion 44. The frame portion 42 and front panel portion 44 together define a cavity 46 that is generally rectangular or bathtub-shaped with an opening 47. Also, as shown in FIG. 3, the frame portion 42 and front panel portion 44 together have a cross sectional shape that is generally U-shaped. Wrapper 22 may have a front surface 23 that is flat, or the front surface 23 may be slightly convex as shown in FIG. 2. In the illustrated example, surface 23 is cylindrical with a radius of approximately 10-20 feet. As also discussed below, the sheets 40 are disposed inside an impermeable envelope 48 that is sealed to prevent entry of gas inside the envelope 48 such that the sheets 40 are disposed in a vacuum.

Figure 4:
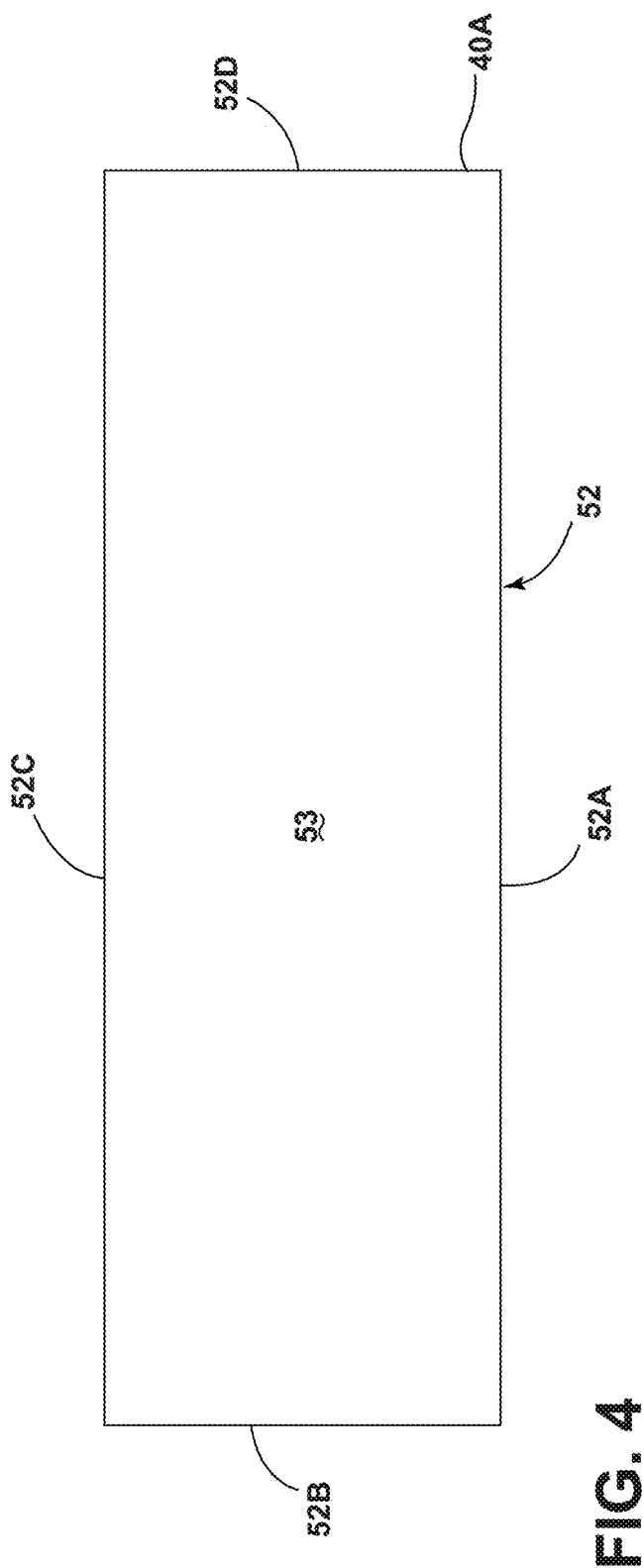
FIG. 4 is a top plan view of a fiberglass mat.
Figure 5:
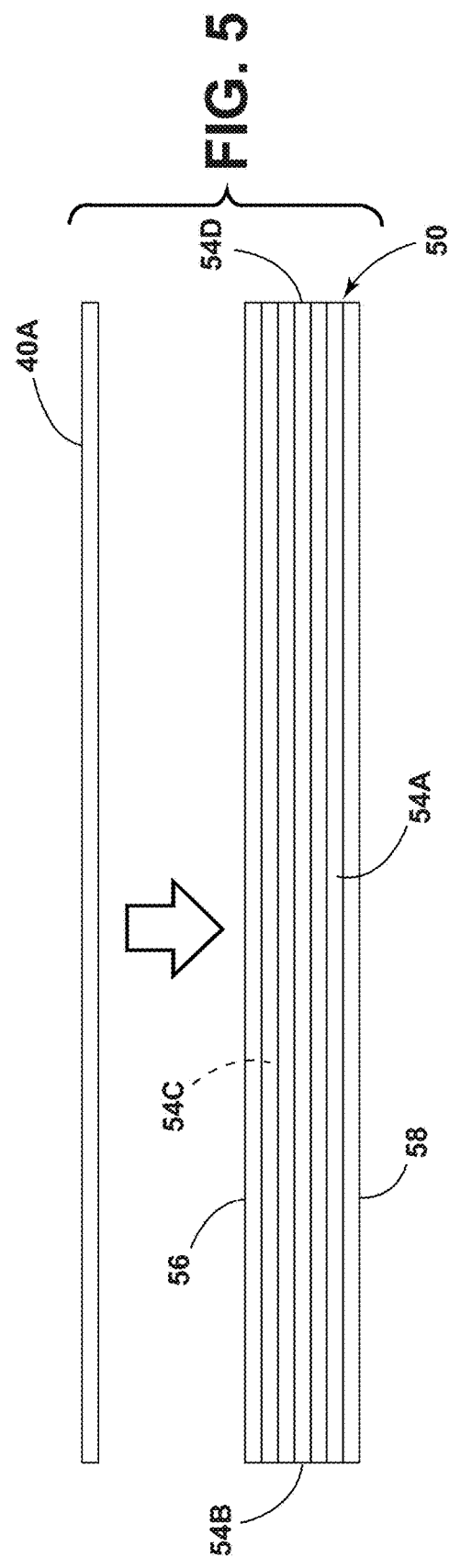
FIG. 5 is an exploded side elevational view of plurality of fiberglass mats.
Figure 14:
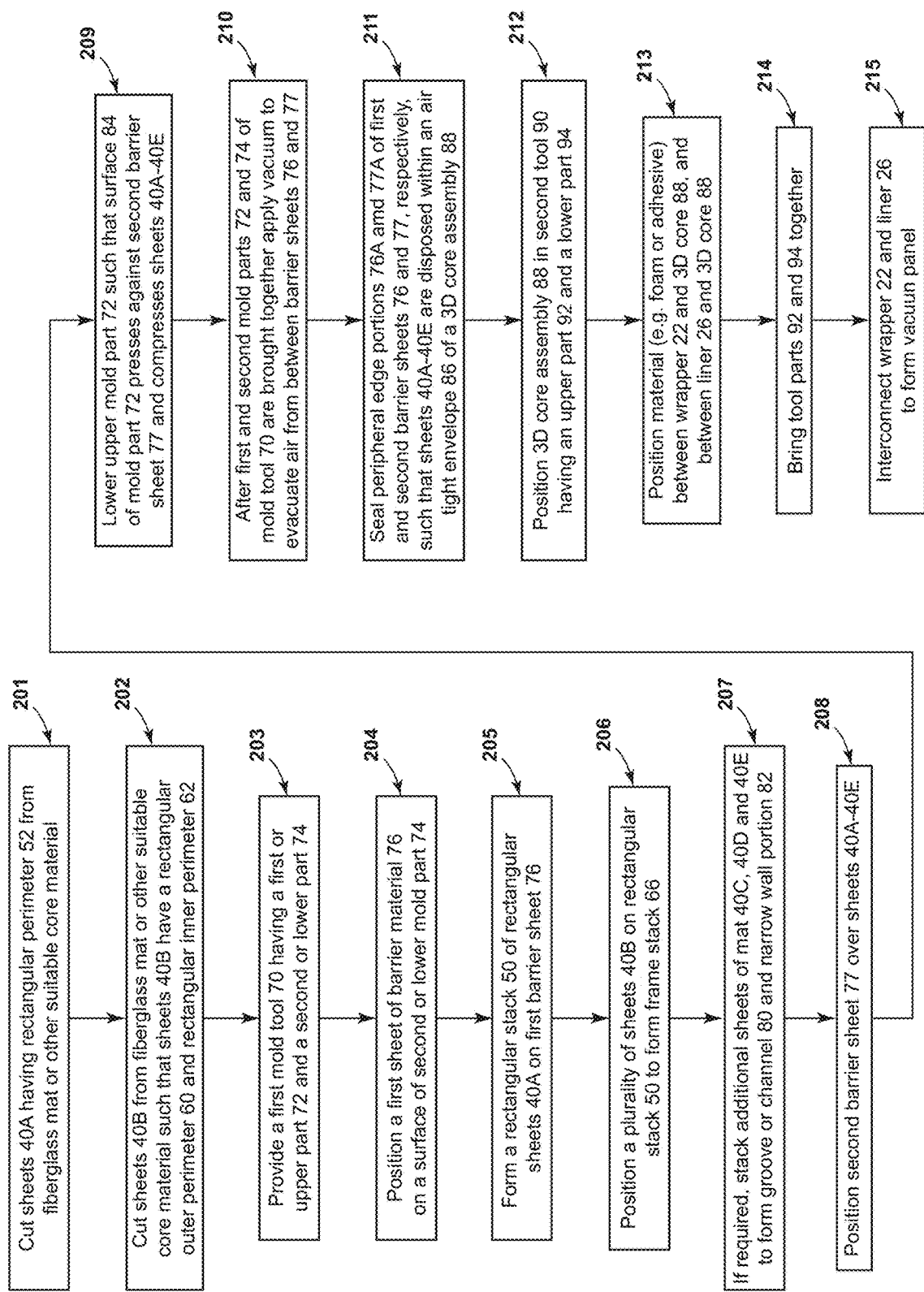
FIG. 14 is a flowchart showing a method of making a vacuum insulated refrigerator structure.

With reference to FIGS. 4 and 5, a plurality of sheets 40A having a generally rectangular perimeter 52 with generally linear edge portions 52A-52D may be cut from fiberglass mat or other suitable core material (see also step 201; FIG. 14). The rectangular sheets 40A may be stacked to form a rectangular stack 50 having four side surfaces 54A-54D corresponding to edges 52A-52D, respectively, and generally planar inner and outer sides 58. When assembled, outer side 58 faces towards wrapper 22, and inner side 56 faces towards liner 26. The sheets 40A may all have the same size and shape, and may include a central portion 53 that is substantially continuous. When stacked, the sheets 40A form a rectangular stack 50 with sides 54A-54B that are orthogonal to the inner and outer sides 56 and 58, respectively. Sheets 40A may optionally be positioned on a curved mold surface to form cylindrical upper and lower surfaces 56 and 58 that correspond to curved outer surface 23 of vacuum panel 20. As discussed in more detail below, the sheets 40 may have different sizes and/or shapes to provide side surfaces that are tapered, curved, or the like. The rectangular stack of sheets 50 may be utilized to form the front panel portion 44 (FIG. 3) of vacuum panel 20.

Figure 6:
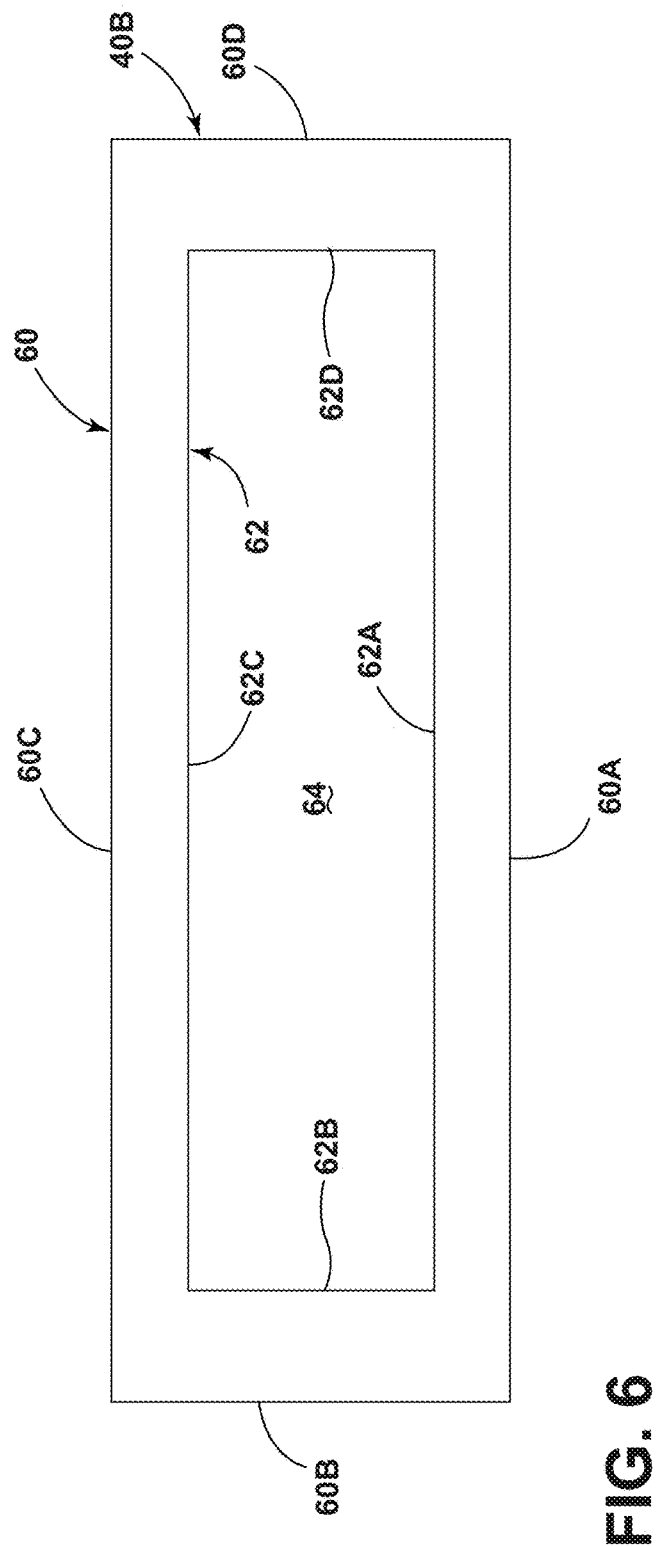
FIG. 6 is a top plan view of a fiberglass mat.
Figure 7:
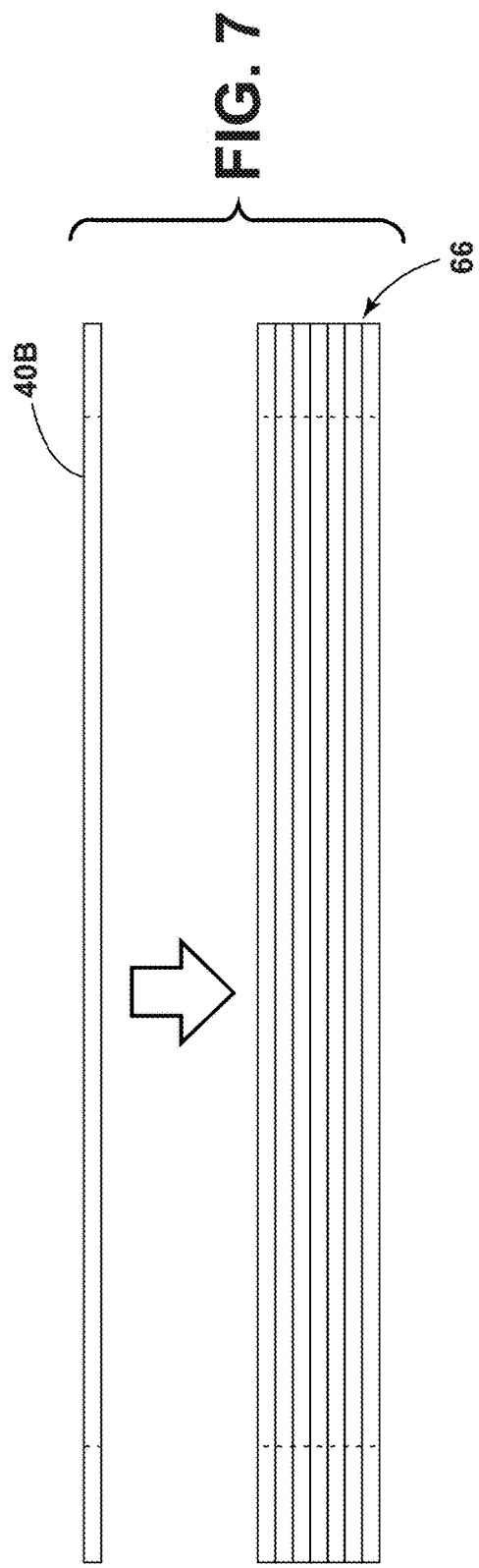
FIG. 7 is an exploded side elevational view of a stack of fiberglass mats.

With further reference to FIGS. 6 and 7, a plurality of sheets 40B of fiberglass mat or other material may cut to include a rectangular outer perimeter 60 including four linear portions 60A-60C (see also step 202; FIG. 14). The sheets 40B may also be cut to include an inner perimeter 62 having four linear portions 62A-62D forming a rectangular central opening 64. The individual sheets 40B can be stacked to form a frame stack portion 66 corresponding to the frame portion 42 (FIG. 3) of vacuum panel 20. Linear portions 62A-62D of central openings 64 of sheets 40B form sidewalls 36A-36D, respectively of cavity 46 when wrapper 22 and liner 26 are assembled.

Figure 8:
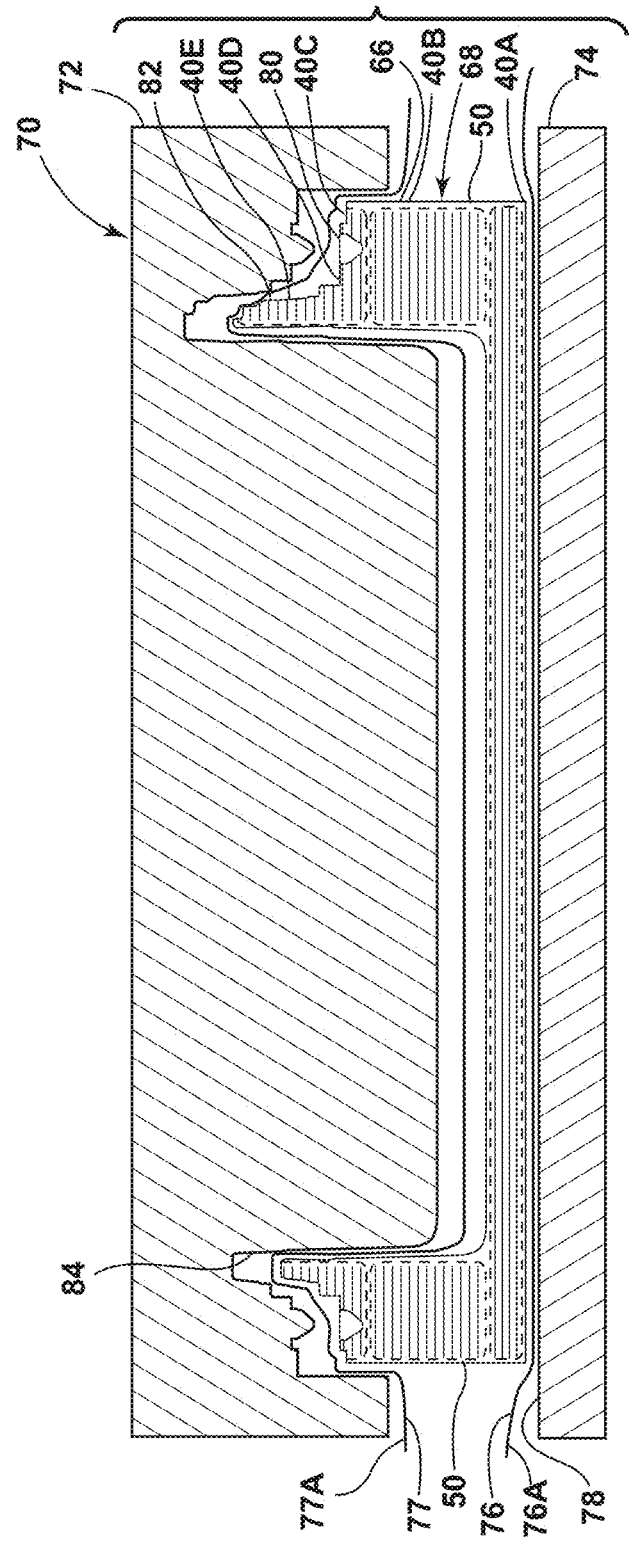
FIG. 8 is a cross sectional view showing a vacuum insulated core structure in a mold tool.

With further reference to FIG. 8, during assembly a 3D vacuum insulated panel ("VIP") core 68 may be assembled utilizing a mold tool 70 having a first or upper part 72 and a second or lower part 74 (see also step 203; FIG. 14). A first sheet of barrier material 76 may initially be positioned on surface 78 of second mold part 74 (see also step 204; FIG. 14). Surface 78 may be flat or it may be curved/cylindrical if a curved front surface 23 (FIG. 2) is to be formed. A plurality of rectangular sheets of material 40A are then stacked on top of first barrier sheet 76 to form a rectangular stack 50 corresponding to the front panel portion 44 (FIG. 3) of vacuum panel 20 (see also step 205; FIG. 14). A plurality of sheets 40B are then positioned on the rectangular stack 50 to form a frame stack 66 (see also step 206; FIG. 14). Additional sheets of fiberglass mat 40C, 40D, and 40E are then stacked to form a groove or channel 80 and a narrow wall portion 82 (see also step 207; FIG. 14). The sheets 40A-40E may be cut to have inner and/or outer peripheral edges with sizes and shapes as required to provide the proper three dimensional shape as required for a particular application.

After the sheets 40A-40E are stacked together, a second barrier sheet 77 is positioned over the sheets 40A-40E (see also step 208; FIG. 14). Upper mold part 72 is then lowered such that surface 84 of mold part 72 presses against second barrier sheet 77, and compresses the sheets 40A-40E (see also step 209; FIG. 14). The surface 84 of first mold part 72 has a surface contour that closely corresponds to the shape of the inner side surface of liner 26 such that the stacked sheets 40A-40E are compressed and formed to fit closely against liner 26. Similarly, surface 78 of mold part 74 has a shape that closely corresponds to the inner surface of wrapper 22 to provide a close fit. After the first and second mold parts 72 and 74, respectively of mold tool 70 are brought together to compress the sheets 40A-40E, a vacuum may be applied to evacuate air from between the barrier sheets 76 and 77 (see also step 210; FIG. 14). For example, the mold tool 70 may be positioned inside a vacuum chamber. Peripheral edge portions 76A and 77A of first and second barrier sheets 76 and 77, respectively, are then sealed such that the sheets 40A-40E are disposed within an airtight envelope 86 (see also FIG. 9, and step 211, FIG. 14). Barrier sheets may comprise known barrier material that is substantially impervious to gasses such as nitrogen, water vapor, oxygen, carbon monoxide, carbon dioxide, etc. It will be understood that sheets 40A-40E may be positioned inside an airtight envelope 86 having an opening prior to positioning the sheets 40A-40E in mold tool 70, and the opening of the envelope may be sealed while sheets 40A-40E are compressed in a vacuum.

Figure 9:
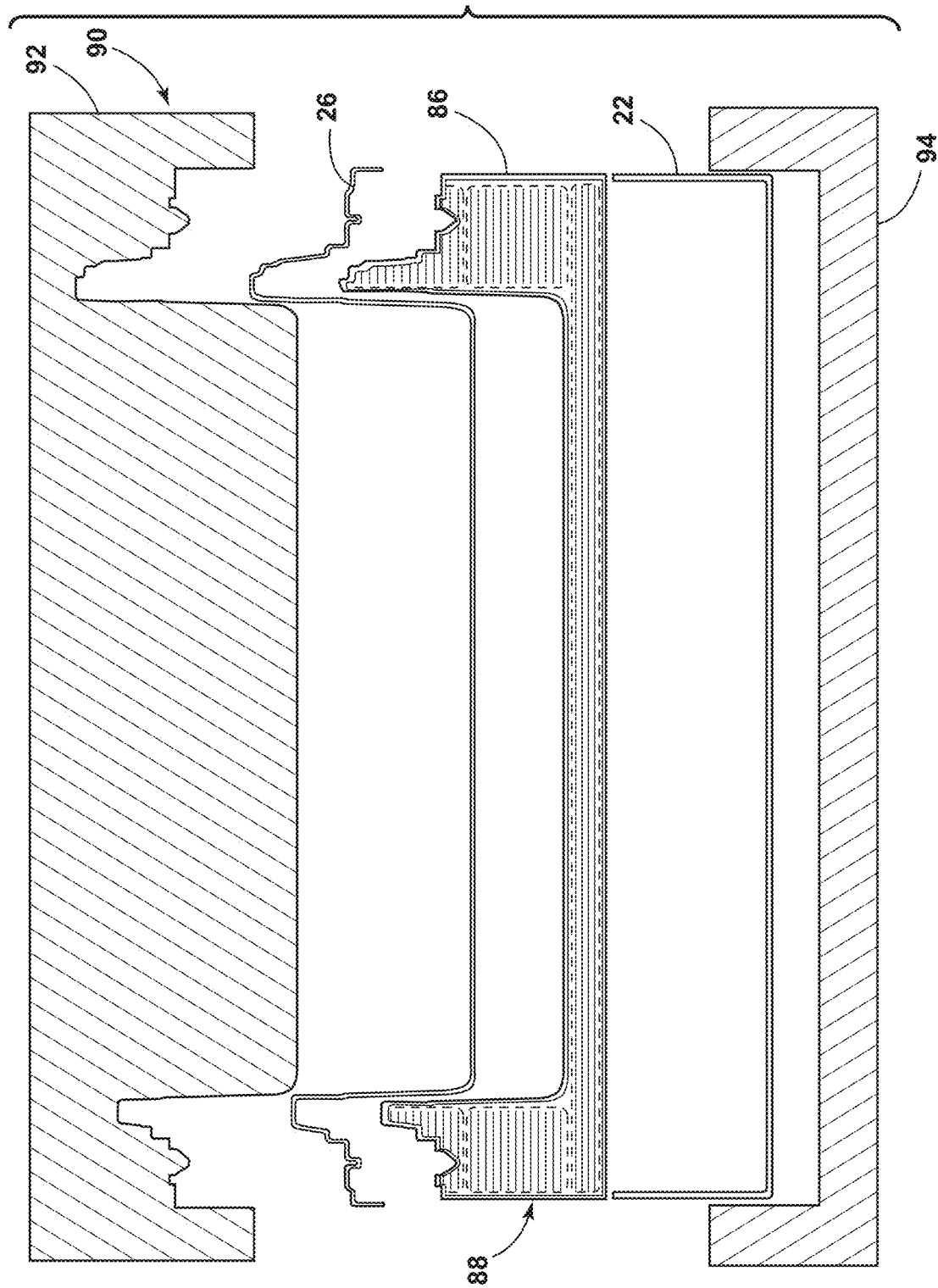
FIG. 9 is a cross sectional view showing a vacuum core, wrapper, and liner in a mold tool.

With further reference to FIG. 9 the 3D core assembly 88 formed in mold tool 70 (FIG. 8) may be positioned in a second tool 90 having an upper part 92 and a lower part 94 (see also step 212; FIG. 14). Foam, adhesive, or other suitable material (not shown) may be positioned between wrapper 22 and 3D core 88, and between liner 26 and 3D core 88 (see also step 213; FIG. 14). The tool parts 92 and 94 are then brought together, and the wrapper 22 and liner 26 are interconnected in a known manner to form vacuum panel 20 (see also steps 214, 215; FIG. 14).

Figure 10:
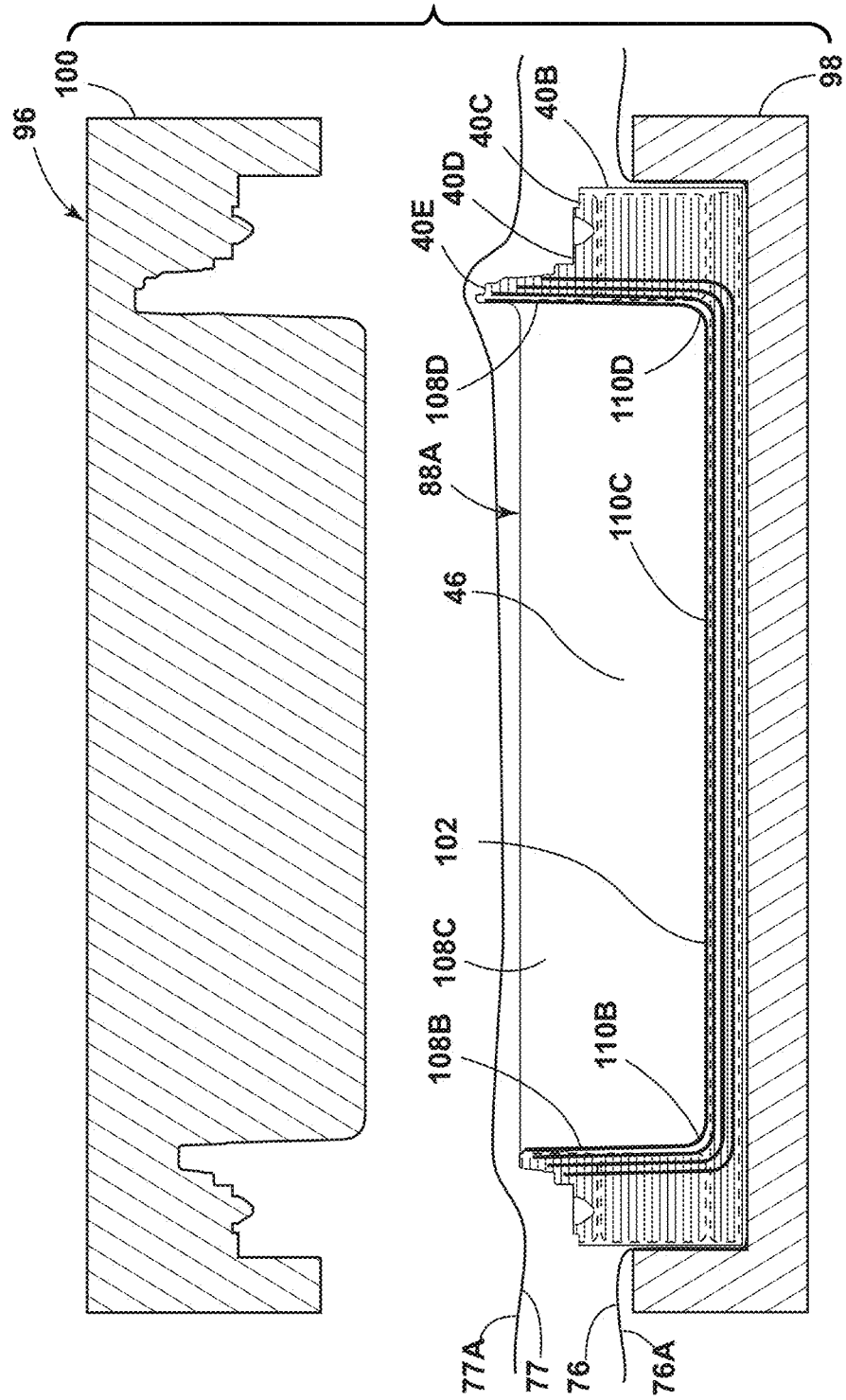
FIG. 10 is an exploded cross sectional view of a vacuum core in a mold tool.
Figure 11:
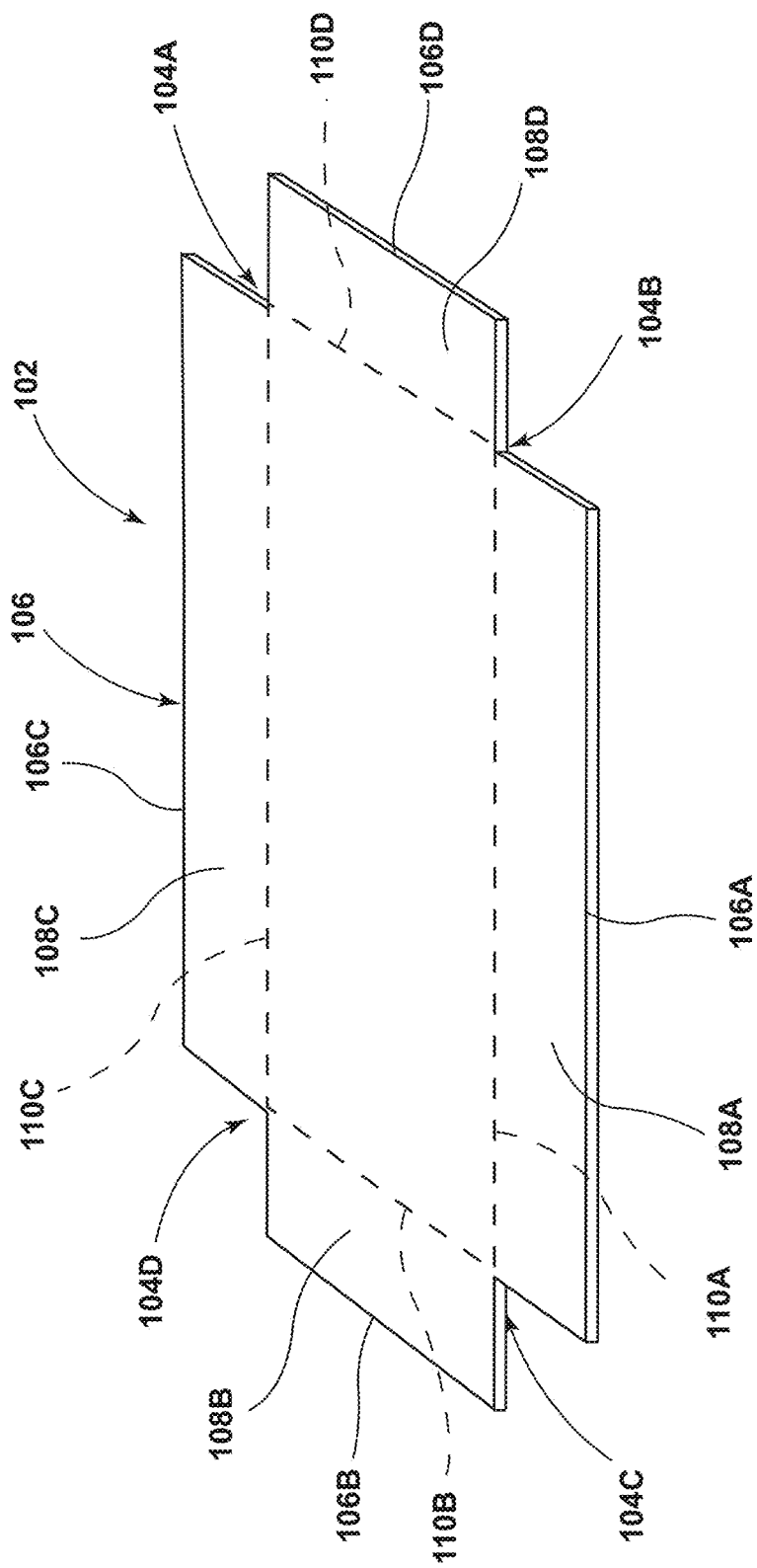
FIG. 11 is an isometric view of a fiberglass mat.

With further reference to FIG. 10, a 3D core 88A may be formed by positioning a plurality of sheets 40B-40E in a first or lower mold tool 98 of a mold tool 96 that also includes a second or upper mold part 100. A plurality of sheets of flexible fiberglass mat 102 are then positioned in rectangular cavity 46. As shown in FIG. 11, the sheets 102 have a generally rectangular perimeter 106 with linear sides 106A-106C. Notches 104A-104D are cut in the corners to form flaps 108A-108D. When the sheets 102 are positioned in cavity 46, the flaps 108A-108D are folded along fold lines 110A-110D, respectively such that the flaps 108A-108D extend upwardly along the sides of cavity 46. A second barrier sheet 77 is then positioned over the stacked sheets, and the second tool part 100 is shifted towards the first tool part 98 to thereby compress the sheets of material. A vacuum is then formed, and edges 76A and 77A of barrier sheets 76 and 77, respectively are then sealed together. The 3D core 88A may then be assembled with wrapper 22 and liner 26 in substantially the same manner as described above in connection with FIG. 9.

With further reference to FIGS. 12 and 13, a 3D core 88B may be formed utilizing a plurality of sheets 140, wherein each of the sheets has an outer edge or perimeter 142. The outer edges or perimeters 142 may have different sizes and/or shapes to thereby form side surfaces 146A-146D that may be angled or otherwise configured to be non-perpendicular to opposite sides 148 and 150 of 3D core 88. The 3D core 88B may be compressed in tools and sealed in an envelope (not shown) in substantially the same manner as described above in connection with FIG. 3. The 3D core 88B may then be assembled with a liner and wrapper as described above in connection with FIG. 9.

It is to be understood that variations and modifications can be made on the aforementioned structures and methods without departing from the concepts of the present device, and further it is to be understood that such concepts are intended to be covered by the following claims unless these claims by their language expressly state otherwise. For example, the processes described above may be utilized to form a wide range of insulted cabinet structures including doors, panels for doors, cabinets, panels for cabinets or virtually any other type of vacuum insulated structure.

What is claimed is:

1. A method of making a vacuum insulated refrigerator structure, the method comprising:
positioning a plurality of overlapping stacked sheets of a flexible core material that are disposed inside an envelope of impermeable barrier material between first and second mold parts of a mold tool;
pressing the overlapping stacked sheets into a predefined three dimensional shape by pressing the first and second mold parts together;
evacuating the overlapping stacked sheets utilizing a vacuum;
sealing the envelope while the overlapping stacked sheets are evacuated to form a three dimensional vacuum core;
removing the three dimensional vacuum core from the mold tool;
positioning the three dimensional vacuum core between a wrapper and a liner; and
interconnecting the wrapper and the liner to form a vacuum insulated refrigerator structure.

2. The method of claim 1, wherein:
the sheets of flexible core material have peripheral edges defining shapes, and wherein the shapes of the peripheral edges of at least two sheets are not identical.

3. The method of claim 1, wherein:
a plurality of first adjacent stacked sheets of flexible core material are ring-shaped with enlarged central openings therethrough defining sizes, wherein the sizes of the openings are not equal.

4. The method of claim 3, wherein:
a plurality of second adjacent stacked adjacent sheets define outer peripheral edges having sizes that are smaller than the sizes of the enlarged central openings of the first adjacent stacked sheets, and wherein the outer peripheral edges of the plurality of second adjacent stacked sheets are spaced apart from the inner peripheral edges of the first adjacent stacked sheets to form a core groove therebetween.

5. The method of claim 1, wherein:
the liner includes a curved portion forming a raised ridge disposed in the core groove, and an exterior groove corresponding to the core grove; and including:
positioning an elongated resilient gasket in the exterior groove.

6. The method of claim 1, wherein:
a first plurality of the overlapping stacked sheets of flexible core material have rectangular outer peripheral edges and enlarged rectangular openings therethrough defining rectangular inner peripheral edges to define a frame core having an enlarged rectangular opening therethrough having four side surfaces defined by the rectangular inner peripheral edges.

7. The method of claim 6, including:
forming a second plurality of sheets of flexible core material, each having a central portion and a generally rectangular perimeter with four edge portions and corner notches at each corner to define flaps at each edge portion;
positioning the second plurality of sheets of flexible core material in the enlarged rectangular opening with the flaps extending transversely from the central portion along the four side surfaces of the enlarged rectangular opening.

8. The method of claim 6, including:
positioning a second plurality of sheets of flexible core material that do not have enlarged openings therethrough in a stacked relationship with the first plurality of overlapping stacked sheets of flexible core material to close off the enlarged openings such that the three dimensional vacuum core forms a cavity that opens towards the liner.

9. The method of claim 1, wherein:
the overlapping stacked sheets are evacuated while the overlapping stacked sheets are being pressed into a three dimensional shape by the first and second mold parts.

10. The method of claim 1, wherein:
the sheets of flexible core material comprise fiberglass mat.

11. The method of claim 1, wherein:
the liner comprises a thermoformed polymer material; the wrapper comprises sheet metal.

12. A method of making a vacuum insulated refrigerator door having an inner side and an outer side, the method comprising:
cutting a first plurality of sheets of fiberglass mat such that each sheet of the first plurality of sheets has a rectangular outer peripheral edge and a rectangular inner edge forming an enlarged central opening through each sheet of the first plurality of sheets;
providing a second plurality of sheets of fiberglass mat, each sheet of the second plurality of sheets having a rectangular peripheral edge and a continuous central portion that does not have an opening therethrough;
stacking the second plurality of sheets;
stacking the first plurality of sheets with the second plurality of sheets to form a stacked assembly having a rectangular frame portion and an outer panel portion that together form an inwardly-opening rectangular cavity;
forming an envelope of impermeable material around the stacked assembly;
forming a vacuum inside the envelope;
sealing the envelope to form a three dimensional vacuum core;
positioning the three dimensional vacuum core between a wrapper and a liner; and
interconnecting the wrapper and the liner to form a vacuum insulated refrigerator door structure.

13. The method of claim 12, including:
pressing the stacked assembly between first and second mold parts.

14. The method of claim 13, including:
forming a vacuum inside the envelope while the stacked assembly is pressed between the first and second mold parts.

15. The method of claim 12, wherein:
each of the first plurality of sheets have substantially identical shapes and sizes.

16. The method of claim 12, wherein:
the rectangular outer peripheral edges and/or the rectangular inner edges of at least two of the first plurality of sheets are not identical in shape and/or size.

17. The method of claim 12, wherein:
the first plurality of sheets includes a plurality of outer sheets adjacent the second plurality of sheets, and a plurality of inner sheets that are disposed away from the second plurality of sheets with the plurality of outer sheets disposed between the plurality of inner sheets and the second plurality of sheets;
the shapes and sizes of the rectangular inner edges of the plurality of outer sheets are substantially identical to the shapes and sizes of the rectangular inner edges of the plurality of rectangular inner edges of the plurality of inner sheets to form a rectangular cavity having four sides that are generally flat;
the rectangular outer perimeters of the inner sheets are smaller than the rectangular outer perimeters of the outer sheets such that the outer sheets define a step;
the liner includes first and second transverse surfaces forming a step that fits over the step formed by the first plurality of sheets, wherein the first surface faces opposite the outer side of the refrigerator door, and the second surface includes four portions that face away from the rectangular cavity; and including:
securing an elongated resilient gasket to the first surface of the liner.

* * * * *